(12) United States Patent
Sågfors et al.

(10) Patent No.: US 8,214,710 B2
(45) Date of Patent: Jul. 3, 2012

(54) METHODS AND APPARATUS FOR PROCESSING ERROR CONTROL MESSAGES IN A WIRELESS COMMUNICATION SYSTEM

(75) Inventors: Mats Fredrik Sågfors, Kyrkslätt (FI); Per Johan Torsner, Masaby (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 903 days.

(21) Appl. No.: 12/260,189

(22) Filed: Oct. 29, 2008

(65) Prior Publication Data
US 2009/0119564 A1 May 7, 2009

Related U.S. Application Data

(60) Provisional application No. 60/984,818, filed on Nov. 2, 2007.

(51) Int. Cl.
*G06F 11/00* (2006.01)
(52) U.S. Cl. ...................................................... 714/748
(58) Field of Classification Search .................. None
See application file for complete search history.

(56) References Cited

U.S. PATENT DOCUMENTS

| | | | |
|---|---|---|---|
| 6,473,399 B1 | 10/2002 | Johansson et al. | |
| 6,643,813 B1 | 11/2003 | Johansson | |
| 7,130,295 B2 | 10/2006 | Kim et al. | |
| 7,145,889 B1 | 12/2006 | Zhang et al. | |
| 7,145,897 B2 | 12/2006 | Sachs et al. | |
| 7,197,317 B2 | 3/2007 | Parkvall et al. | |
| 2007/0049309 A1* | 3/2007 | Pan et al. | 455/509 |
| 2007/0283032 A1* | 12/2007 | Kim et al. | 709/230 |
| 2008/0002688 A1* | 1/2008 | Kim et al. | 370/389 |
| 2008/0096571 A1* | 4/2008 | Pedersen et al. | 455/450 |
| 2008/0175195 A1* | 7/2008 | Cho et al. | 370/329 |
| 2009/0067364 A1* | 3/2009 | Chang et al. | 370/315 |
| 2009/0077430 A1* | 3/2009 | Cho et al. | 714/701 |
| 2011/0134829 A1* | 6/2011 | Chen et al. | 370/328 |

FOREIGN PATENT DOCUMENTS

| | | |
|---|---|---|
| EP | 1845649 A2 | 10/2007 |
| WO | 2007066883 A1 | 6/2007 |

OTHER PUBLICATIONS

3GPP, "Universal Mobile Telecommunications Systems (UMTS); Radio Link Control (RLC) protocol specification," 3GPP TS 25.322 version 6.10.0 Release 6, Jun. 2007, pp. 1-87, ETSI, Sophia Antipolis Cedex, France.

3rd Generation Partnership Project; Technical Specification Group Radio Access Network; Evolved Universal Terrestrial Radio Access (E-UTRA) Radio Link Control (RLC) protocol specification (Release 8); 3GPP TS 36.322 V8.1.0 (Mar. 2008); 35 pages.

(Continued)

*Primary Examiner* — Gabriel Chu

(57) ABSTRACT

Methods and apparatus for processing error control messages, such as RLC ARQ control messages, are disclosed. An exemplary method comprises signaling a medium access controller (MAC) that link resources are needed for transmitting data, receiving an indication from the MAC that link resources for transmitting the data are scheduled, and generating an error control message after receiving said indication, based on a current error control status. The error control message is then forwarded to the MAC for transmission. Because the generation of an error control message is delayed until resources for its transmission are scheduled, the queuing of stale control messages is avoided.

14 Claims, 5 Drawing Sheets

OTHER PUBLICATIONS

3GPP. 3rd Generation Partnership Project: Technical Specification Group Radio Access Network: Evolved Universal Terrestrial Radio Access (E-UTRA) Radio Link Control (RLC) Protocol Specification (Release 8). 3GPP TS 36.322 V1.0.0 (Sep. 2007).

3GPP. 3rd Generation Partnership Project; Technical Specification Group Radio Access Network; Medium Access Control (MAC) Protocol Specification (Release 6). 3GPP TS 25.321 V6.14.0 (Sep. 2007).

* cited by examiner

METHODS AND APPARATUS FOR PROCESSING ERROR CONTROL MESSAGES IN A WIRELESS COMMUNICATION SYSTEM

RELATED APPLICATIONS

This application claims priority from PCT Application Serial No. PCT/SE2008/050728 filed on 18 Jun. 2008, which in turn claims priority from U.S. Provisional Application Ser. No. 60/984,818 filed on 1 Nov. 2007. These applications are expressly incorporated in their entireties by reference herein.

TECHNICAL FIELD

The present invention relates generally to wireless communication systems, and more particularly to processing error control messages in a wireless system that schedules link resources.

BACKGROUND

The Third-Generation Partnership Project (3GPP) has launched a program to develop advanced wireless communication system specifications, in an initiative known as "Long Term Evolution," or LTE. In standardization discussions, it has been agreed that LTE systems shall utilize an automatic repeat request (ARQ) mechanism in the radio link control (RLC) protocol. The specified ARQ protocol is a selective repeat protocol (used in "RLC Acknowledged Mode"), which provides means for sending status reports from a receiving node to a transmitting node, as well as means for the transmitting node to poll the receiving node for a status. In response to receiving a status report, the transmitting node may resend any lost data, or take other action as appropriate. In response to a poll, a receiver generally sends a status report. However, the sending of a status report may be prohibited under some circumstances. For instance, a status-prohibit timer initiated at the sending of a prior status report may prevent a status report for a period of time.

The 3GPP developers have also agreed to specify a set of poll and status triggers, as well as timers that regulate a node's response to either a poll or a status report. Examples of triggers and timers that have recently been agreed for inclusion in the 3GPP LTE standards include:
  automatic status reporting upon detection of a missing protocol data unit (PDU);
  automatic polling in response to transmitting the last PDU in a transmit buffer, thus providing the transmitting node with an assurance that a burst of data has been fully received;
  a status-prohibit timer to prevent a node from sending status reports too frequently, since too frequent status reporting can result in unnecessary re-transmissions; and
  a poll-retransmit timer, to ensure that an unanswered poll, which might have been lost, is re-transmitted.

Of course, additional triggers and timers are likely to also be adopted in LTE. It can be expected that the RLC ARQ protocol for LTE will ultimately have many similarities with the Wideband-CDMA (W-CDMA) RLC protocol specified in 3GPP TS 25.322. In addition to the Acknowledged Mode, the RLC protocol for LTE will also include an unacknowledged mode as well as a transparent mode.

In a conventional RLC ARQ scheme, RLC timers and status reports are created in response to certain triggers. For example, if a receiving node receives a poll and there is no status prohibit timer running, then the receiving node immediately generates a status report representing the current receiver status. A typical status report may include an identifier for a last received protocol data unit (PDU) and/or a negative acknowledgement for one or more PDUs that were not successfully received. The status report is then offered to the medium access control (MAC) layer for transmission to the transmitting node. (Those skilled in the art will appreciate that each wireless communication node will typically include a transmitter and receiver. Further, an ARQ scheme may be implemented in both directions. For the purposes of this disclosure, the term "transmitting node" generally refers to the node that transmits one or more data PDUs, in acknowledged mode, to a "receiving node." In 3GPP terminology, Acknowledged Mode data is sent by the "transmitting side of an Acknowledged Mode RLC entity"; the PDUs are transmitted to the "peer entity" or the "receiving side" of an Acknowledged Mode RLC entity. Given this usage, a receiving node may transmit a status PDU to the transmitting node. Likewise, a transmitting node may receive a status PDU.)

In systems that employ a status-prohibit timer, the receiving node typically starts the status-prohibit timer at the moment the status report is transferred from the RLC layer to the MAC layer. No further status reports are then allowed before the timer has elapsed, even if one or more new triggers for a status report occur in the meantime. Such triggers might be another poll received from the transmitting node, the detection of a missing PDU, or the like. Thus, the status-prohibit time ensures that a subsequent status report is delayed by at least the time period specified by the status-prohibit timer.

In LTE systems, the uplink (for mobile-to-base-station transmissions) is a scheduled resource, where the scheduling is controlled by a serving base station (called an evolved Node B, or eNodeB, in LTE). As a result, a mobile station may not have immediate access to transmission resources at a given instant. If the MAC layer in a mobile station receives a status report from the RLC layer when no uplink resources are currently scheduled, then the mobile station must first request those resources before it can transmit the status report to the eNodeB. Since the scheduling is controlled by the eNodeB, it may happen that a grant of uplink resources is significantly delayed. For instance, multi-user scheduling may slow the allocation of resources, or an initial scheduling request may be lost during transmission. As a result, transmission of the status report could be delayed to the extent that the receiver state characterized by the status report may be outdated even before it is transmitted.

SUMMARY

Disclosed herein are methods and apparatus for processing error control messages, such as RLC ARQ control messages. An exemplary method comprises signaling a medium access controller (MAC) that link resources are needed for transmitting data, receiving an indication from the MAC that link resources for transmitting the data are scheduled, and generating the error control message after receiving said indication, based on a current error control status. The error control message is then forwarded to the MAC for transmission. Because the generation of an error control message is delayed until resources for its transmission are scheduled, the queuing and transmission of stale control messages is avoided.

In another aspect of the invention, the MAC may notify the radio link controller (RLC) when the transmission of an RLC ARQ control message is either commenced or acknowledged. In response to the notification, the RLC controller may start or restart an error control timer. The timer may comprise, for example, a poll timer or a status prohibit timer.

DETAILED DESCRIPTION

Figure 1:
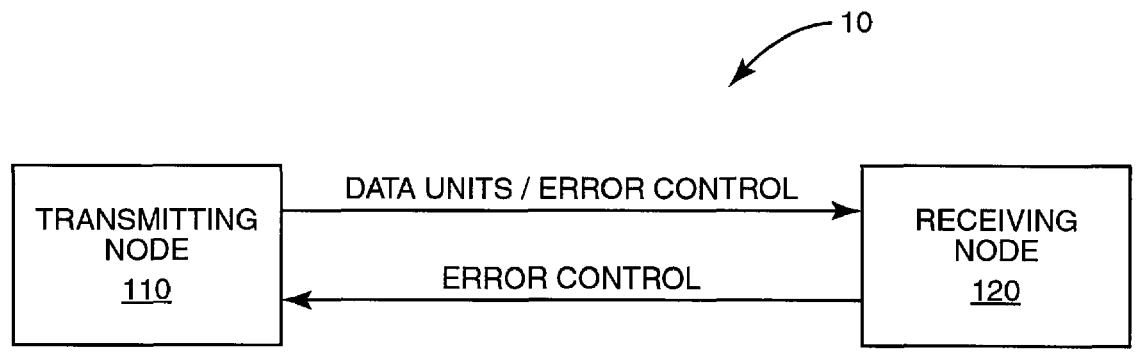
FIG. 1 is a simplified view of a communication system according to an embodiment of the invention.

FIG. 1 provides a simplified view of a communication system 10, including a transmitting node 110 and a receiving node 120. As was discussed above, the transmitting node 110 and receiving node 120 each comprise a complete transceiver; the terms "transmitting" and "receiving" are used to describe particular endpoints in an acknowledged data transfer. Thus, the transmitting node 110 transmits one or more data units, which may comprise protocol data units (PDUs), to the receiving node 120, and may also transmit one or more error control messages, such as a polling request. (As will be discussed below, an error control message, such as a poll, may be included in the same protocol data unit as traffic data.) The receiving node 120 may in turn transmit one or more error control messages, such as a status report, or a request to re-transmit a PDU that was unsuccessfully received.

In some embodiments of the present invention, the transmitting node 110 may comprise an LTE eNodeB and the receiving node 120 may comprise an LTE-compatible mobile station. In this case, the data units pictured in FIG. 1 are transmitted, by the eNodeB, on the downlink, while one or more error control messages are transmitted on the uplink. However, those skilled in the art will appreciate an ARQ scheme may also be implemented in the opposite direction, to detect errors in delivering PDUs over the uplink. In this case, the roles of transmitting and receiving nodes are reversed between the eNodeB and the mobile station.

Although the inventive techniques disclosed herein are described in reference to an LTE system, the present invention is not limited to such a system. The skilled practitioner, upon reading the following description and viewing the attached drawings, will appreciate that the techniques described herein may be applied to a variety of wireless systems, and in particular to systems that dynamically schedule transmission resources in the uplink, downlink, or both.

Figure 2:
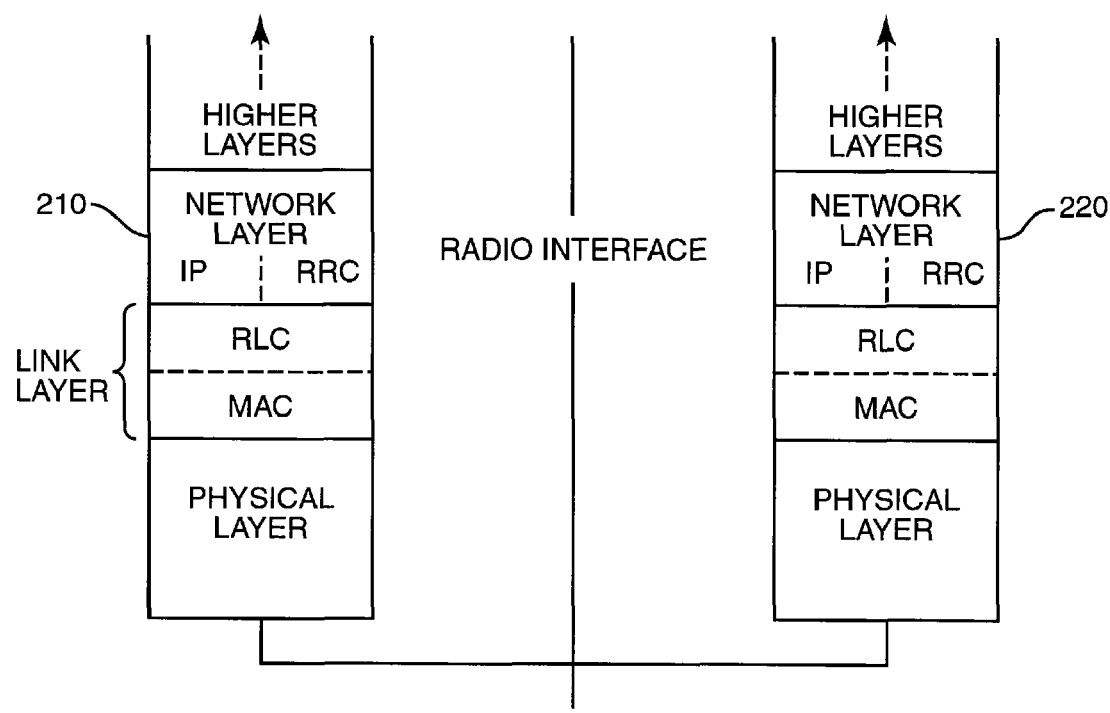
FIG. 2 illustrates several communication protocol layers that may be employed in the system of FIG. 1.

Each of the communication nodes in FIG. 1 are configured to operate according to a specified communication protocol, such as the LTE protocols specified by 3GPP. Several protocol layers are illustrated in FIG. 2; these protocol layers may be implemented at each of the communication nodes using analog and digital hardware, programmable processors configured with appropriate software, or a combination. In particular, transmitting node 110, which may be an LTE mobile station, may use the protocol layers in protocol stack 210 to communicate with corresponding protocol layers in protocol stack 220 of the receiving node 120, e.g., an LTE eNodeB.

Each of the protocol stacks 210 and 220 includes a physical layer, a data link layer, and a network layer. The data link layer is split into two sub-layers, a radio link control (RLC) layer and a medium access control (MAC) layer. In this exemplary embodiment the network layer is divided into a control plane protocol (RRC) and a user plane protocol (IP).

In LTE systems, the physical layer uses Orthogonal Frequency Division Multiple Access (OFDMA) technology for the downlink, and the closely related Single-Carrier Frequency Division Multiple Access (SC-FDMA) for the uplink. In general, the physical layer provides data transfer over the air (radio) interface, and includes such functions as multiplexing and de-multiplexing of transport channels, mapping of transport channels onto physical channels, modulation and demodulation of physical channels, forward error correction encoding and decoding, frequency and time synchronization, transmit power control, RF processing, and the like.

The medium access control (MAC) layer generally provides unacknowledged transfer of service data units (SDUs) between peer MAC entities. MAC functions may include selecting an appropriate transport format for each transport channel depending on data rate, handling priorities between data flows of various users (in a base station supporting multiple users), scheduling control messages, multiplexing and de-multiplexing higher layer PDUs, etc. In an LTE system, scheduling of resources is also performed by the MAC layer. In particular, uplink resources may be requested by a MAC layer for a mobile station, and are allocated among mobile stations by the corresponding MAC layer in the eNodeB.

The RLC layer performs various functions including the establishment, release, and maintenance of an RLC connection, segmentation and reassembly of variable length, higher layer PDUs into or from smaller RLC PDUs, concatenation, error correction by retransmission (ARQ), in-sequence delivery of higher layer PDUs, duplicate detection, flow control, and other functions. The RRC protocol handles the control signaling over the radio interface, e.g., radio access bearer control signaling, measurement reporting and handover signaling. The user plane part of the network layer includes the traditional functions performed by layer 3 protocols, such as the well known Internet Protocol (IP).

The radio link control (RLC) protocol layer in protocol stacks 210 and 220 includes an Automatic Repeat Request (ARQ) mechanism. The RLC layer in a transmitting node 110 receives user data, segments it, and transforms it into RLC PDUs. In some embodiments, a transmitted RLC PDU may include a field that indicates whether the transmitted message is a data PDU or a control PDU. Another field may correspond to a polling field, which may contain a bit indicating that the transmitting node 110 wants a status report from the receiving node. The RLC PDU may further comprise a "Sequence Number" field that indicates the sequence number of a data PDU; this sequence number may be incremented for each new data PDU. Finally, a data field contains segments of higher level data information. "Length Indicator" and extension "E" fields may also be included in an RLC PDU.

In response to a PDU in which the polling bit P is set to "1", the receiving node's RLC layer may generate a status report indicating which RLC PDUs have been properly received. Positive or negative acknowledgements, or a combination of both, may be used. In LTE, a status report PDU includes an Acknowledgement Sequence Number (ACK_SN) field indicating the lowest sequence among the PDUs that have neither been received nor detected as lost by the receiving node. The status report PDU may further include one or more Negative Acknowledgement Sequence Number (NACK_SN) fields that identify PDUs detected as lost by the receiving node. Thus, when a transmitting node 110 receives a status report PDU, it determines that all PDUs up to, but not including, the PDU corresponding to ACK_SN have been received, except for those PDUs identified by the one or more NACK_SN fields.

As briefly mentioned above, the dynamic scheduling of resources in some systems may cause delays between the generation of error control messages, such as the polling PDUs or status report PDUs discussed here, and the actual transmission of those messages. In systems where transmission resources are persistently available, such as in 3GPP Wideband-CDMA systems, an RLC control message (e.g., status report PDU or poll PDU) is typically transmitted immediately after it has been generated, except for a short processing delay. Thus, when a status report is transmitted, for example, it presents a generally accurate "snapshot" of the receiver state. In LTE, by contrast, the uplink is strictly scheduled and the mobile station typically lacks any such persistent resources. If the mobile station is not scheduled, the MAC layer of the mobile station first requests uplink resources before it transmits the status report PDU. The resulting delay may cause the status report PDU to be outdated before it is actually transmitted to the eNodeB.

Figure 3:
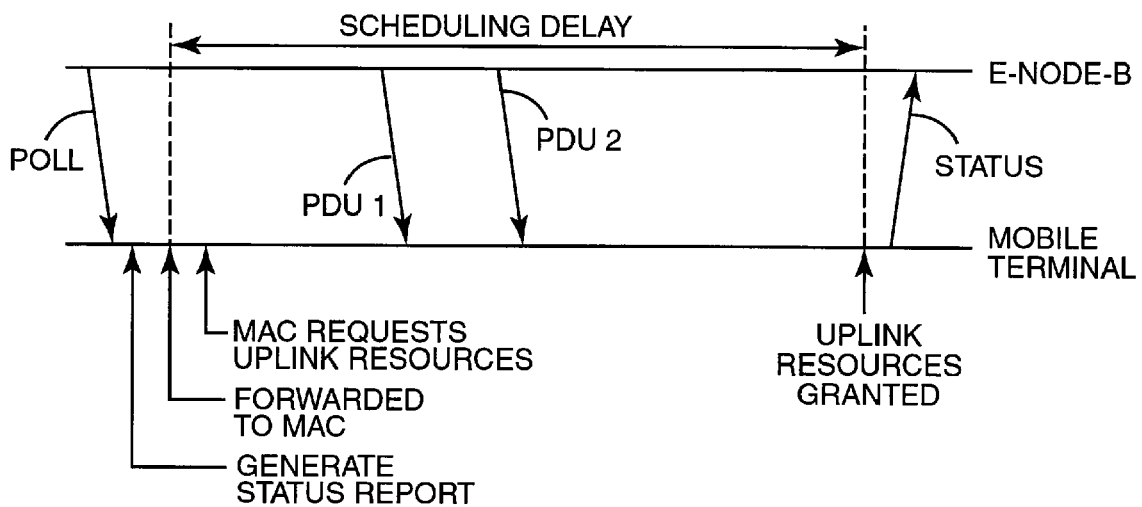
FIG. 3 illustrates the effect of scheduling delay on the formation of an ARQ status report.

This problem is illustrated in FIG. 3, in which events at an eNodeB are illustrated along the upper horizontal line, and events at a mobile terminal are illustrated along the lower horizontal line. The event flow of FIG. 3 begins with the transmission of a poll request from the eNodeB to the mobile station, as pictured at the left-hand side of the figure. As discussed above, in a conventional system, the mobile terminal immediately (except for processing delays) generates a status report. In an LTE system, as discussed above, this status report may indicate that one or more Acknowledged Mode PDUs (or portions thereof) were lost, or unsuccessfully processed.

After the RLC layer generates the status report, the status report is forwarded to the MAC layer for delivery to the eNodeB. However, in the pictured event flow, resources are not immediately available for transmitting data over the uplink. Thus, the MAC layer requests uplink resources from the eNodeB, by sending a scheduling request. As was discussed above, the granting of uplink resources may be subject to considerable delays. These delays may occur simply because the eNodeB is servicing many mobile stations, or because the eNodeB is currently allocating resources to higher priority requests. In some cases, delays may be caused or exacerbated by the failure of the resource request to be successfully received by the eNodeB, so that the request must be repeated.

In any case, the granting of uplink resources in the event flow pictured in FIG. 3 is eventually received by the mobile terminal, but after a considerable scheduling delay. This delay period is illustrated in FIG. 3 from the perspective of the RLC, i.e., from the instant that the error control message (status report) is forwarded by the RLC to the MAC until the time that the MAC receives the grant of uplink resources. During this period, several additional RLC PDUs, namely PDU 1 and PDU 2, are received by the mobile terminal. Thus, by the time the status report is transmitted to the eNodeB, as illustrated at the right-hand side of the figure, the status report is already out of date. Because the status report does not reflect the receipt of PDU 1 and PDU 2, the eNodeB has been provided with inaccurate information as to the mobile station receiver's current status. This might result in a re-transmission of PDU 1 and PDU 2, wasting downlink resources and potentially causing further delays in queued data.

Scheduling delays may also cause problems with the operation of timers related to error control processes. For instance, if an RLC timer controlling the transmission of status reports, such as the status-prohibit timer, is started when the PDU carrying the status report is offered to the MAC layer, then it may happen that the timer expires too early. In the worst case, the RLC layer might offer several RLC status reports to the MAC layer, all of which are queued for transmission. If these status reports contain a negative acknowledgement for the same RLC PDUs, the same PDUs may be retransmitted several times by the peer RLC entity.

A similar problem may apply to timers controlling polling. If a poll timer is started when the PDU carrying the poll is offered to the MAC layer, it may happen that the poll timer elapses too early due to delay in transmission of the PDU carrying the poll. This could result in unnecessary polls being queued and transmitted to the receiver. This is illustrated in the event flow of FIG. 4. As with FIG. 3, events at an eNodeB are illustrated along the upper horizontal line, while events at the mobile terminal are shown along the lower line. At the left-hand side of the figure, a polling control message, Poll 1, is generated by the eNodeB RLC layer. The polling control message is immediately forwarded to the MAC layer for transmission to the mobile terminal, and a poll timer, which establishes a minimum delay before another poll request may be generated, is started. However, the Poll 1 message is not actually transmitted to the mobile terminal until after a considerable delay, which may result from scheduling delays of from a backed-up transmission queue.

Figure 4:
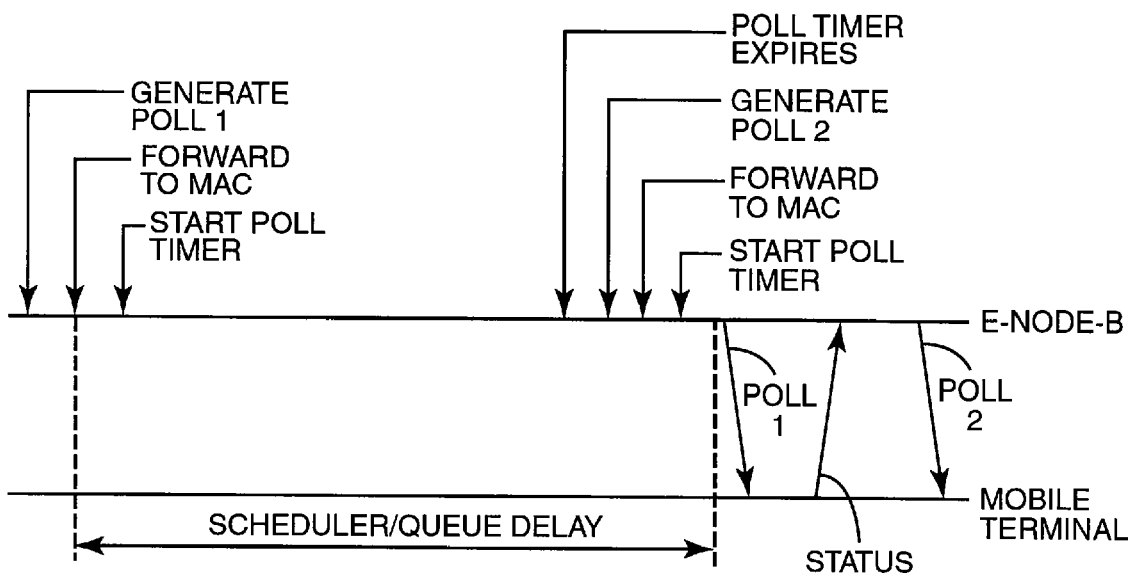
FIG. 4 illustrates the effect of scheduling delay on an ARQ poll timer.

In some cases, the delay in transmitting the poll request may extend until after the poll timer expires, as shown in FIG. 4. Upon expiry of the poll timer, the RLC layer, which is unaware that the previous poll was not transmitted, generates a second poll request, Poll 2. This second poll request is forwarded to the MAC, and the poll timer re-started.

Finally, the first poll request (Poll 1) is transmitted to the mobile station. In the pictured scenario, the uplink delays are not significant, so a status report is returned quickly. Shortly afterwards, the second poll request (Poll 2) is transmitted by the eNodeB and received by the mobile terminal. Although a status-prohibit timer may prohibit the generation and transmission of another status report by the mobile terminal, the second poll request is clearly unnecessary, and a waste of system resources.

FIGS. 3 and 4 illustrate only a few of the RLC error control timing problems that might arise from scheduling and queuing delays in a wireless system with scheduled resources. Another problem is that status reports or polls may be delayed because higher priority data is already queued. Consider a mobile terminal (a receiving node with respect to the downlink, a transmitter with respect to the uplink) with multiple bearers, or "logical channels," having different priorities. Assume that the mobile terminal has data in the transmit buffer for the highest priority bearer and that the mobile terminal receives scheduling grants from the eNodeB that leave no bandwidth for transmission of PDUs associated with bearers of lower priority. Further, assume that a trigger for transmitting a status report or a poll on a lower-priority bearer occurs. Since the mobile terminal lacks resources for transmitting this PDU, the status report or poll may be significantly delayed. As in the scenarios discussed above, the status report may in some cases become outdated before it is transmitted. In extreme cases, several status reports or polls may be queued until resources for the lower-priority bearer are available, leading to unnecessary retransmissions.

A solution to several of the above problems is to modify the conventional ARQ processes described earlier in such a way that the content of an error control message (e.g., an RLC PDU carrying ARQ control information) is generated only when the MAC layer can offer resources for transmitting the RLC PDU. In some embodiments this may be accomplished by providing an additional or modified interface between RLC and MAC layers. This additional interface may permit the RLC layer to request the MAC layer to transmit an RLC PDU carrying control information. In addition, this additional interface allows the MAC layer to notify the RLC layer when link resources are available for transmitting the RLC PDU layer carrying control information. In this manner, the RLC layer may defer actually generating the control information until the resources, so that the error control message ultimately delivered includes updated information of the RLC layer's state.

Over this interface, the RLC layer of a communicating node (e.g., a mobile station) may first report the need to the MAC layer for transmission of an RLC ARQ control message, such as a status report. Upon notification from the MAC layer to the RLC layer that the needed resources are (or will shortly be) available, the RLC layer then creates the relevant control information (e.g., the status report information), packages the control information into an RLC PDU, and submits the RLC PDU to the MAC layer for transmission to the remote node. Embodiments of the invention cover the cases where the RLC PDU carries either an RLC status report or a poll, and may similarly be applied to other error control messages.

Figure 5:
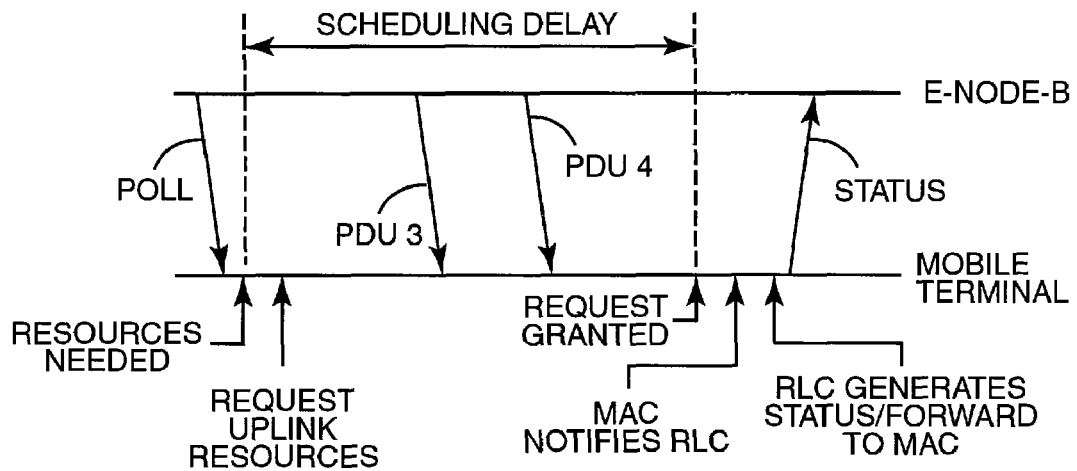
FIG. 5 illustrates the timing of ARQ status report generation according to one embodiment of the invention.

FIG. 5 presents an event flow diagram, similar to those of FIGS. 3 and 4, illustrating the operation of a system according to some embodiments of the invention. As was the case in FIG. 3, a poll request is transmitted by the eNodeB, and received by the mobile terminal, at the left-hand side of the figure. In response to this trigger, the RLC layer in the mobile terminal determines that uplink resources will be needed for transmitting an error control message, in this case a status report. The RLC layer thus signals the MAC layer that uplink resources are needed, as indicated in FIG. 5. The MAC layer responds by requesting uplink resources from the scheduler, if resources are not already scheduled.

Those skilled in the art will appreciate that the signaling from the RLC layer to the MAC layer that uplink resources are needed may or may not specifically indicate that those resources are required for transmission of an error control message. Thus, in some embodiments, the signal may simply indicate that an RLC PDU is pending, and that uplink resources should be scheduled if not already available. In other embodiments, it may be advantageous for the signaling to specifically indicate that the resources are needed for a control message.

In any event, the actual granting of resources may come only after a significant delay, as illustrated in FIG. 5. During this delay, several acknowledged mode RLC PDUs, PDU 3 and PDU 4, are received at the mobile terminal during the scheduling delay. However, in this scenario the status report has not been generated, and is not queued in the MAC layer awaiting transmission. Instead, as illustrated in FIG. 5, the RLC layer defers generating the status report data until after the MAC layer notifies the RLC that the uplink resource request has been granted (i.e., that uplink resources are available). Thus, the status report includes current data (including the status of PDU 3 and PDU 4) when it is forwarded to the MAC and transmitted to the eNodeB. Although there may still be processing and queuing delays, these delays are minimal compared to the situation pictured in FIG. 3.

Some embodiments of the present invention utilize similar techniques for starting and re-starting timers for error control processing, such as the RLC ARQ polling and status-prohibit timers discussed above. In these embodiments, activation of an error control timer may be triggered by a MAC layer notification (to the RLC layer) that an RLC PDU carrying error control information has been transmitted, or is about to be transmitted, to the remote node.

Figure 6:
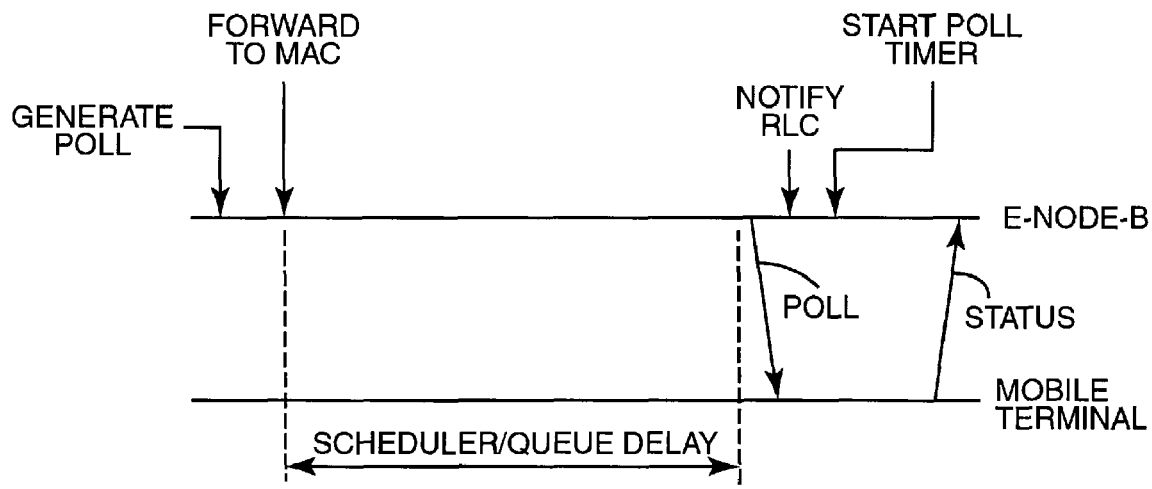
FIG. 6 illustrates poll timer processing according to one embodiment of the invention.

Exemplary operation for one such embodiment is pictured in FIG. 6. In this event flow, as was the case in the event flow pictured in FIG. 4, a poll request is triggered in the eNodeB. The RLC PDU carrying the poll request is forwarded to the MAC for transmission to the mobile terminal. However, in this case, the poll timer is not immediately started. Instead, the poll timer is not started until after the MAC layer notifies the RLC layer that the poll request has been transmitted. As pictured in FIG. 6, this might occur after a significant scheduling/queuing delay. Because the starting of the poll timer was deferred until at or near the time the poll request was actually transmitted, the timer does not expire prior to receipt of the status report from the mobile terminal. An unnecessary retransmission of the poll request is thus avoided.

In some embodiments, the MAC layer may be configured to notify the RLC layer that the transmission of the PDU carrying the RLC ARQ control information has commenced, or is about to commence. In other embodiments, the MAC layer may instead notify the RLC layer that the transmission of the PDU carrying the RLC ARQ control information has been acknowledged on the MAC HARQ layer. Those skilled in the art will appreciate that the techniques described above with respect to a poll timer may also be applied to other error control timers, such as a status-prohibit timer.

Figure 7:
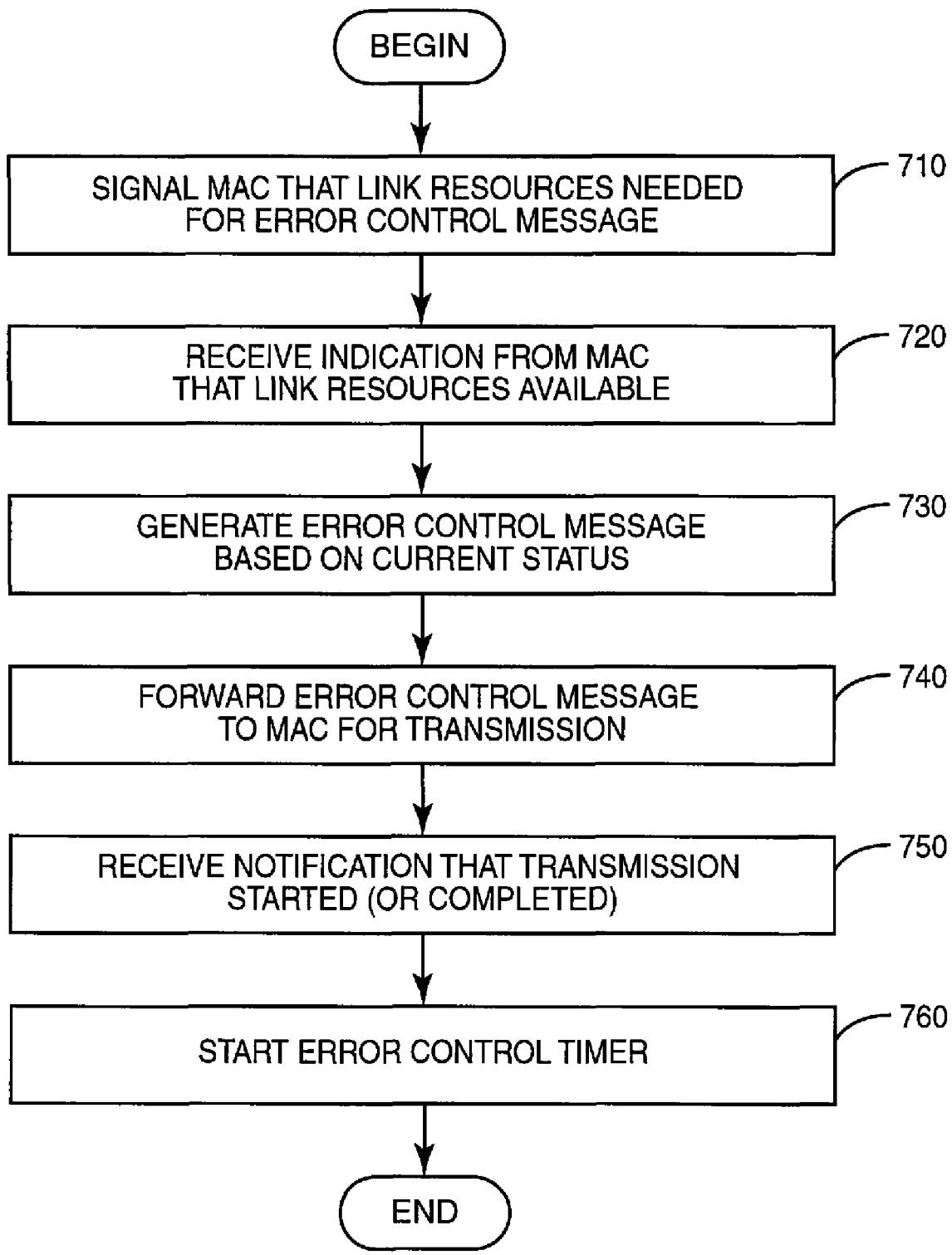
FIG. 7 is a logic flow diagram illustrating an exemplary method of processing error control messages.

FIG. 7 is a logic flow diagram illustrating an exemplary method for processing error control messages such as might be carried out by one or more of the RLC and MAC controllers discussed above. In the pictured method, the inventive techniques disclosed herein are applied to both the generation of an error control message and to the activation of an error control timer. Those skilled in the art will appreciate, of course, that many embodiments of the invention will apply these techniques to both error control processes, but that some may apply the techniques to one process or the other, but not both.

In any event, the exemplary method of FIG. 7 begins at block 710, with the signaling, to the MAC controller in a communications node, that link resources are needed for the transmission of an error control message. As was discussed above, this may be triggered by any of several different events. For instance, the receipt of a poll request at a receiving node will generally trigger a status report process. In this case, then, the signaling for link resources at block 710 is for resources to transmit the status report. Another possible trigger event is the expiry of an error control timer. For instance, the expiration of a poll timer may trigger a new poll request, in which case the signaling at block 710 may be to request resources for triggering the new poll request.

In any event, at block 720, an indication is received from the MAC controller that link resources are available. As was discussed at length above, this may occur almost immediately after the request for resources, or may occur after a significant scheduling delay. In either case, an error control message is generated at block 730, in response to the indication that link resources are available. Thus, the error control message contents are generated based on a current status, and are not rendered "stale" by any scheduling delay. At block 740, the error control message is forwarded to the MAC controller for transmission. Because the message generation of block 730 and the message forwarding of block 740 was deferred until after the indication that resources were available, transmission delays after forwarding to the MAC controller are minimized.

At block 750, a notification is received from the MAC controller that transmission of the of the error control message has begun, or has completed. In response to this notification, an appropriate error control timer, such as a poll timer or a status-prohibit timer, is activated, as shown at block 760.

The RLC and MAC procedures described herein may be implemented respectively by an RLC controller and MAC controller implementing the RLC and MAC layers, respectively, of the protocol stacks 210 and 220 discussed earlier. Those skilled in the art will appreciate that these procedures may be implemented by modifying conventional RLC controller and MAC controllers, which, as discussed above, may be implemented by one or more programmable processors, hardware circuits, or a combination thereof.

Further, the methods disclosed herein may be implemented at either or both ends of a wireless link, such as the LTE mobile terminals or eNodeBs discussed above. Thus, FIG. 8 illustrates the general features of a wireless communications apparatus according to one or more embodiments of the invention; the pictured wireless apparatus 800 may comprise, in various embodiments, a mobile terminal (including a cellular telephone, wireless personal digital assistant, wireless personal computer, machine-to-machine device, etc.), a base station, a repeater, or other node terminating a wireless link.

Figure 8:
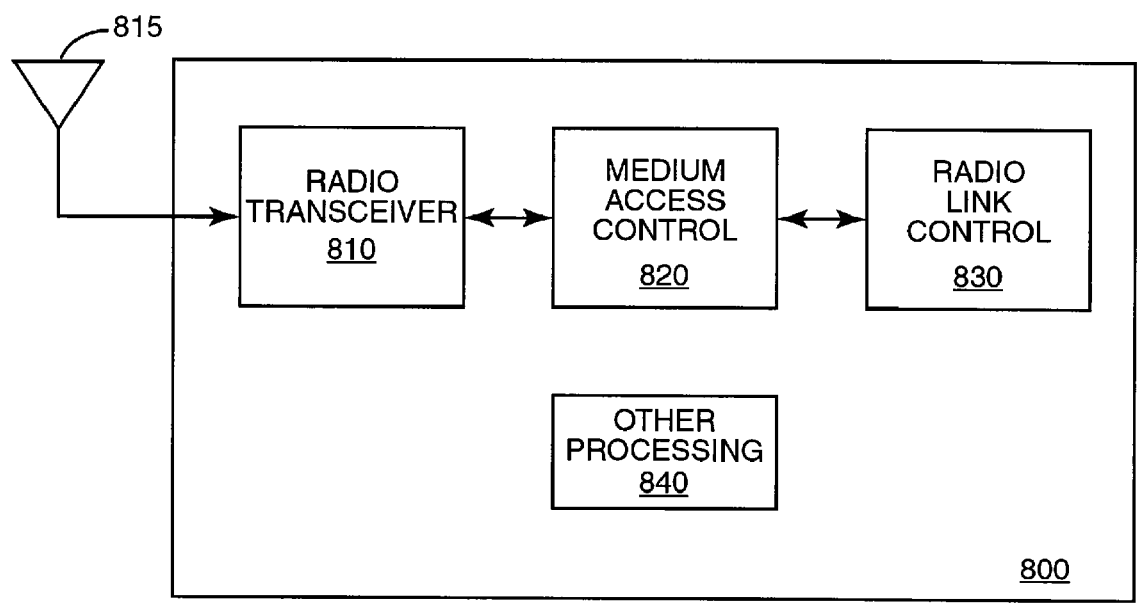
FIG. 8 is a block diagram of a wireless apparatus according to one or more embodiments of the present invention.

The wireless apparatus 800 of FIG. 8 includes a radio transceiver 810, operable to communicate over one or more radio links with a remote transceiver, via antenna 815. In some embodiments, radio transceiver 810 is configured to receive and transmit signals formatted according to a standard, such as any of the wireless standards promulgated by 3GPP. In particular, radio transceiver 810 may be configured to transmit and/or receive OFDMA and SC-FDMA signals according to the LTE standards.

Wireless apparatus 800 further includes a Medium Access Control function 820, a Radio Link Control function 830, and other processing 840. The general functions of the MAC and RLC functions are discussed above; these functions may be implemented on any of a variety of combinations of analog and digital hardware and programmable processors configured with software. Those skilled in the art will appreciate that these functions, as well as other functions necessary for the operation of wireless apparatus 800 may be implemented using one or several programmable processors. In many embodiments, the MAC 820 and RLC 830 functions are implemented as a protocol stack, such as the protocol stack 210 of FIG. 2, implemented on a single microprocessor or application-specific integrated circuit configured with software to carry out the various RLC and MAC functions described herein.

In particular, RLC controller 830 may be implemented with a microprocessor programmed with software defining an RLC layer, in which the RLC layer is configured to signal a medium access controller that link resources are needed for transmitting data, receive an indication from the medium access controller that link resources for transmitting the data are scheduled, and, responsive to the indication, generate an error control message based on a current error control status for the RLC layer. The error control message may comprise, but is not limited to, a poll request or a status report. In some embodiments, the RLC layer may be further configured to receive a notification that transmission of the error control message has begun and to start an error control timer responsive to the notification. The error control timer may comprise, but is not limited to, a poll timer or a status-prohibit timer.

Similarly, all or part of MAC controller 820 may be implemented on the same microprocessor, or on one or more other microprocessors, programmed with software defining a MAC layer. The MAC layer is configured to receive a signal from the RLC layer indicating that link resources are needed for transmitting data, and to request link resources as necessary. The MAC layer is further configured to notify the RLC layer upon receiving a grant of resources. In some configurations, the MAC layer is still further configured to notify the RLC layer when an error control message (provided to the MAC by the RLC layer) has been transmitted, or, in some embodiments, when transmission of the error control is imminent.

The teachings of the present disclosure may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method for processing error control messages in a wireless communication system, the method comprising:
signaling a medium access controller that link resources are needed for transmitting data;
receiving an indication from the medium access controller that link resources for transmitting the data are available;
responsive to the indication, generating an error control message based on a current error control status;
forwarding the error control message to the medium access controller for transmissions
starting an error control timer; and
refraining from generating further error control messages until the error control timer expires.

2. The method of claim 1 wherein the error control message comprises an automatic repeat request (ARQ) status report message.

3. The method of claim 1 wherein the error control message comprises a re-transmission request.

4. The method of claim 1 wherein the error control message comprises an automatic repeat request (ARQ) poll message.

5. The method of claim 1 wherein the error control timer comprises one of a poll-retransmit tinier and a status-prohibit timer.

6. The method of claim 1 wherein starting the error control timer comprises:
receiving a notification that transmission of the error control message has begun; and
starting an error control tinier responsive to the notification.

7. The method of claim 1 wherein starting the error control timer comprises:
receiving a notification that the error control message has been acknowledged; and
starting an error control timer responsive to the notification.

8. A wireless communications apparatus comprising:
a radio transceiver;
a medium access controller operatively connected to the radio transceiver; and
a radio link controller operatively connected to the medium access controller, wherein the radio link controller is configured to:
signal the medium access controller that link resources are needed for transmitting data;

receive an indication from the medium access controller that link resources for transmitting the data are available;

responsive to the indication, generate an error control message based on a current error control status;

forward the error control message to the medium access controller for transmission via the radio transceiver;

start an error control timer; and refrain from generating further error control messages until the error control timer expires.

9. The wireless communications apparatus of claim 8 wherein the error control message comprises an automatic repeat request (ARQ) status report message.

10. The wireless communications apparatus of claim 8 wherein the error control message comprises a re-transmission request.

11. The wireless communications apparatus of claim 8 wherein the error control message comprises an automatic repeat request (ARQ) poll message.

12. The wireless communications apparatus of claim 8 wherein the error control timer comprises one of a poll-retransmit timer and a status-prohibit tinier.

13. The wireless communications apparatus of claim 8 wherein the radio link controller is further configured to start the error control timer by:

receiving a notification from the medium access controller that transmission of the error control message has begun; and starting an error control timer responsive to the notification.

14. The wireless communications apparatus of claim 8 wherein the radio link controller is further configured to start the error control timer by:

receiving a notification from the medium access controller that the error control message has been acknowledged; and starting an error control timer responsive to the notification.

\* \* \* \* \*

UNITED STATES PATENT AND TRADEMARK OFFICE
CERTIFICATE OF CORRECTION

PATENT NO. : 8,214,710 B2  
APPLICATION NO. : 12/260189  
DATED : July 3, 2012  
INVENTOR(S) : Sågfors et al.

Page 1 of 1

It is certified that error appears in the above-identified patent and that said Letters Patent is hereby corrected as shown below:

In the Claims

In Column 10, Line 33, in Claim 1, delete "transmissions" and insert -- transmissions; --, therefor.

In Column 10, Line 45, in Claim 5, delete "tinier" and insert -- timer --, therefor.

In Column 10, Line 51, in Claim 6, delete "tinier" and insert -- timer --, therefor.

In Column 12, Line 3, in Claim 12, delete "tinier." and insert -- timer. --, therefor.

Signed and Sealed this  
Fourteenth Day of April, 2015

Michelle K. Lee  
*Director of the United States Patent and Trademark Office*